(12) United States Patent
Griessbaum

(10) Patent No.: US 10,145,718 B2
(45) Date of Patent: Dec. 4, 2018

(54) LEVEL GAUGE

(71) Applicant: VEGA GRIESHABER KG, Wolfach (DE)

(72) Inventor: Karl Griessbaum, Muehlenbach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 15/157,638

(22) Filed: May 18, 2016

(65) Prior Publication Data

US 2017/0356784 A1 Dec. 14, 2017

(30) Foreign Application Priority Data

Jul. 15, 2015 (EP) .................................... 15176941

(51) Int. Cl.
*G01F 23/26* (2006.01)
*G01F 23/28* (2006.01)

(52) U.S. Cl.
CPC .......... *G01F 23/266* (2013.01); *G01F 23/265* (2013.01); *G01F 23/28* (2013.01)

(58) Field of Classification Search
CPC ................................ G01F 23/266; G01F 23/28
See application file for complete search history.

(56) References Cited

U.S. PATENT DOCUMENTS

| | | | | |
|---|---|---|---|---|
| 3,140,608 | A * | 7/1964 | Clark ................... | G01F 23/263 331/65 |
| 7,525,476 | B1 * | 4/2009 | Delin ................... | G01F 23/284 324/600 |
| 9,304,029 | B2 * | 4/2016 | Guzman ............... | G01F 23/284 |
| 9,778,089 | B2 * | 10/2017 | Edvardsson .......... | G01F 23/284 |
| 2002/0121907 | A1 * | 9/2002 | Griessbaum .......... | G01F 23/284 324/642 |
| 2009/0151446 | A1 * | 6/2009 | Champion ............ | G01F 23/268 73/291 |
| 2010/0156702 | A1 * | 6/2010 | Edvardsson .......... | G01F 23/284 342/124 |
| 2010/0231438 | A1 * | 9/2010 | Ohlsson ................ | G01F 23/284 342/124 |

FOREIGN PATENT DOCUMENTS

| | | | | |
|---|---|---|---|---|
| DE | 3044353 A1 * | 6/1982 | ........... | G01F 23/261 |
| EP | 0916930 A1 * | 5/1999 | ........... | G01F 23/266 |
| WO | WO 2011080018 A1 * | 7/2011 | ............ | G01F 23/24 |

* cited by examiner

*Primary Examiner* — Francis C Gray
(74) *Attorney, Agent, or Firm* — William Gray Mitchell

(57) ABSTRACT

A level gauge with a control and evaluation electronic comprising a signal generator for generating an alternating voltage, a signal detector for detecting a reflected voltage, a resonant measuring probe, and a connecting element, which connects the evaluating electronic electrically to the measuring probe, with the connecting element comprising a first connecting conductor, which connects the signal generator to the measuring probe, and a second connecting conductor which connects the measuring probe to the signal detector.

10 Claims, 2 Drawing Sheets

LEVEL GAUGE

CROSS REFERENCE TO RELATED APPLICATIONS

This patent application claims priority to European Patent Application 15 176 941.1, filed on Jul. 15, 2015.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a measuring arrangement.

Background of the Invention

Level gauges and methods for determining the fill level of a filled or bulk good in a container are known from prior art and are used, for example, in order to detect if a fill level is above or below a predetermined fill status. Such devices are also frequently called fill limit switches.

Fill limit switches can be based on very different physical principles. One of these principles is the evaluation of a capacity, which forms between a measuring electrode and a reference electrode, with the fill good during the filling process of the container fills a space between the reference electrode and the measuring electrode, and here changes the capacity formed by them. There are several different methods to measure the capacity dependent on said fill level. One method for determining the capacity is the formation of an electric resonance circuit including the capacity in question. The resonance frequency of the resonance circuit characterizes here the size of the capacity to be measured.

The resonance circuit may be embodied for example as a serial oscillating circuit with a serial switch of an inductivity with a capacity.

Another principle for a fill level switch comprises the use of a conductor resonance. A conductor embodied as an oblong probe generates reflections of an electric alternating voltage supplied, from which a standing voltage oscillation forms on the probe. The voltage, which can be measured at the voltage feed point, shows a resonant behavior due to the standing oscillation, with here the length of the conductor determining the resonance points. When the conductor probe contacts the fill good, by the capacities and/or additional reflections said fill good causes changes to develop in the frequency position of the resonance points. These can be evaluated with regards to a fill level reported.

The excitation of an electric resonance circuit requires the feeding of an alternating power signal via an alternating power generator. The resonance frequency can be found by changing the frequency of the signal supplied. It is characterized either by elevated voltage or by minimum voltage. The detection of the amplitude of the alternating voltage over the frequency allows here the determination of the resonance point(s).

Some applications of these principles of the limit detection of fill good require for example the installation of the sensor from the top through an existing opening in the lid of the container. However, if simultaneously the switching point of the limit switch shall not be positioned in the upper area of the container, thus in the proximity of the container lid, but further down, the detecting electrode or probe must be moved via an extension to the desired height of the container. Here it is advantageous if the sensor electronic can be fastened outside the container, in this case therefore above the lid of the container. This leads to the fact that the probe has to be separated from the electronic via an extension. This separation is also required in case of applications with very high temperatures inside the container, so that the electronic can be operated without problems distanced from the probe and the temperatures given there.

This leads to the requirement that a conductor is required between the electronic with the generator for the alternating power and the detector of the alternating voltage on the one side and the probe detecting the limit with the electric resonance circuit on the other side, connecting these two components. The electric conductor inserted here leads to the formation of line resonances on the connecting conductor. These line resonances develop in addition to the resonances of the probe, intended by the measuring principle and important for the function thereof, and can lead to disturbing interferences. Such line resonances are particularly disturbing when they are in the same frequency range as the resonances of the probe.

Therefore attention is paid in prior art that the length of the conductor of this extension line is so short that its lowest resonance frequency, thus for example the $\lambda/4$-line resonance, is still clearly above the resonance frequency of the probe.

With regards to the functional safety of the measuring principle, even when media adhere to the probe, it is advantageous to select resonance frequencies of the probe as high as possible, preferably higher than 10 MHz, more preferably higher than 50 MHz and even more preferably in a range higher than 100 MHz.

Accordingly, here a conflict develops between the selection of the resonance frequency of the probe and the potential conductor length of a desired extension between the probe and the electronic. In case of existing devices, this leads for example to the fact that only short extensions of less than 50 cm can be offered.

This problem shall be attained with the present invention. The object of the invention is to provide a level gauge, particularly a fill level switch, according to prior art which allows a spatial arrangement of the probe and the electronic showing a distance as long as possible.

This objective is attained in an arrangement showing the features described herein.

BRIEF SUMMARY OF THE INVENTION

In a preferred embodiment, a level gauge with a control and evaluation electronic comprising a signal generator to generate an alternating voltage, a signal detector to detect an alternating voltage, a resonant measuring probe and a connecting element electrically connecting the control and evaluation electronic to the measuring probe, wherein the connection element comprises a first connection conductor, which connects the signal generator to the measuring probe, and a second connecting conductor, which connects the measuring probe to the signal detector.

In another preferred embodiment, the level gauge as described herein, further comprising wherein a first impedance of the first connecting conductor and an input impedance of the output of the signal generator are adjusted and/or a second impedance of the second connecting conductor and an input impedance of the input of the signal detector are adjusted to each other.

In another preferred embodiment, the level gauge as described herein, wherein the first connecting conductor and the input impedance of the signal generator are adjusted to each other such that a reflection factor at the input of the signal generator is minimized, particularly equal to zero.

In another preferred embodiment, the level gauge as described herein, wherein the second connecting conductor and the input impedance of the signal detector are adjusted to each other such that a reflection factor at the input of the signal detector is minimized, particularly equal to zero.

In another preferred embodiment, the level gauge as described herein, wherein the adjustment occurs by selecting suitable, particularly standardized connecting conductors with a predetermined line impedance of particularly 50 Ohm or 75 Ohm, as well as by adjusting the input impedance of the signal generator and the signal detector by impedance adjustment networks, particularly in a L, T, or Pi-structure, or spurs or other conducting elements.

In another preferred embodiment, the level gauge as described herein, wherein one or both of the first connecting conductor and the second connecting conductor are embodied as a coax cable, two-wire cable, or strip line, particularly as a micro-strip.

In another preferred embodiment, the level gauge as described herein, wherein the level gauge is embodied as a fill level switch.

In another preferred embodiment, the level gauge as described herein, further comprising wherein a length of the connecting conductors amounts to at least at least 50 cm.

In another preferred embodiment, the level gauge as described herein, further comprising wherein a length of the connecting lines amounts to at least one fourth of a wavelength of the resonance frequency of the measuring probe.

In another preferred embodiment, the level gauge as described herein, further comprising wherein a resonance frequency of the measuring probe shows at least 10 MHz.

DETAILED DESCRIPTION OF THE INVENTION

A level gauge according to the invention comprises an electronic with a signal generator for generating an alternating voltage and a signal detector for detecting a voltage reflected by a resonant measuring probe as well as a connecting element, which electrically connects the electronic with the resonance measuring probe, and is characterized in that the connecting element comprises a first connecting line, which connects the signal generator with the measuring probe, and a second connecting line, which connects the measuring probe with the signal detector.

This way it is prevented that at the input of the alternating voltage detector any interferences are given, emitted by the alternating voltage generator and the alternating voltage reflected by the probe, and this way any detection of a resonance generated by the measuring probe being aggravated or prevented.

The first connecting line connects the alternating power generator with the probe and the second connecting line connects the probe with the alternating voltage detector. The connecting lines and the alternating power generator and/or the alternating voltage detector are here advantageously well adapted to each other with regards to their impedance. In particular, advantageously a line impedance of the first connecting line and an input impedance of the output of the alternating power generator as well as a line impedance of the second connecting line and an input impedance of the input of the alternating voltage detector are adjusted to each other. Although this way the development of line resonances cannot be completely prevented on the first connecting line, however the alternating voltage detector connected via the second connecting line to the measuring probe no longer detects them.

Ideally, the first connecting line and the input impedance of the signal generator output are adjusted to each other such that any reflection factor for the alternating voltage returning to the output of the signal generator is minimized, particularly equals zero.

This way, multiple reflections of the alternating voltage signal reflected by the measuring probe and returning to the alternating voltage generator are prevented so that this way already a further improvement of the measuring result can be achieved.

Further, it is advantageous for the second connecting line and the input impedance of the signal detection input to be adjusted to each other such that a reflection factor at the input of the signal detector is minimized, particularly equals zero.

This way it is prevented that the alternating voltage signal reflected by the measuring probe and conducted via the second connecting line to the alternating voltage detector is again reflected at the input of the alternating voltage detector. This way, signal interferences and also repeated reflections are prevented on the second connecting line.

Detailed Description of the Figures

Figure 1:
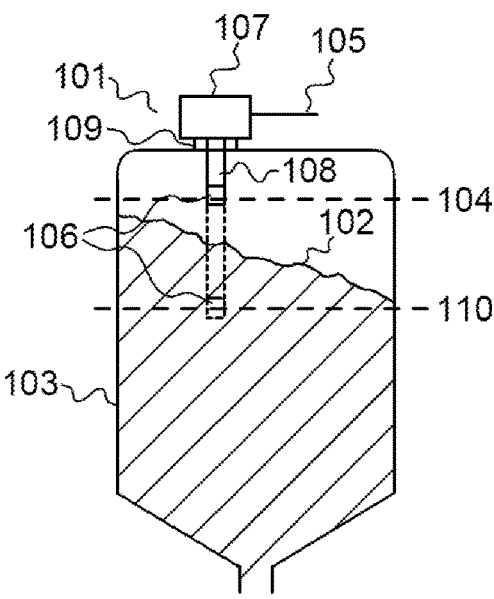
FIG. 1 is a line drawing evidencing an exemplary embodiment for a fill level switch.

FIG. 1 shows an exemplary embodiment for a level gauge 101 as a fill level switch and/or fill level sensor, with the fill level switch being arranged above the surface 102 of the fill good. The fill good is located in a container 103. If the fill good surface 102 exceeds a certain level 104 in the area of the measuring device 101, the so-called limit, the device shall signal that this limit 104 has been exceeded. For this purpose, the device 101 is connected via one or more lines 105 to a display and/or control unit, not shown here, which reacts to the output signal of the limit sensor 101. The limit sensor 101 can also be supplied with electric energy via the line(s) 105. Alternatively, an energy source and/or an energy storage, for example in the form of a battery or an accumulator, may be provided in or at the measuring device. The lines 105 could be omitted entirely in this case when the sensor 101 transmits the information wirelessly to a suitable counterpart.

The fill level switch 101 usually comprises a measuring sensor, here synonymously also called probe 106, and a control and evaluation electronic 107. The probe 106 is located inside the container 103 such that it can come into contact with the fill good. For example, it shows a rod-like shape with its vertical extension ranging from a few millimeters to a few centimeters, depending on embodiment. Another rod-shaped connecting part 108 follows, which serves for the electrical and mechanical connection of the probe 106 to the control and evaluation electronic 107.

The control and evaluation electronic 107 is however arranged advantageously outside the container 103 and inside a protective housing, not shown in greater detail here. A process adaptation 109 is provided between the control and evaluation electronic 107 and the probe 106, which connects the two parts with each other and generates the suitable assembly connection to the container lid.

If the limit 104 shall be detected on an alternative container level 110, the positioning of the probe 106 must be modified accordingly. This is shown in dot-dash lines in FIG. 1. The sensitive probe 106 is therefore located further down in the container 103, resulting in a greater distance between the probe 106 and the control and evaluation electronic 107, which must be bridged by the connection part 108.

Figure 2:
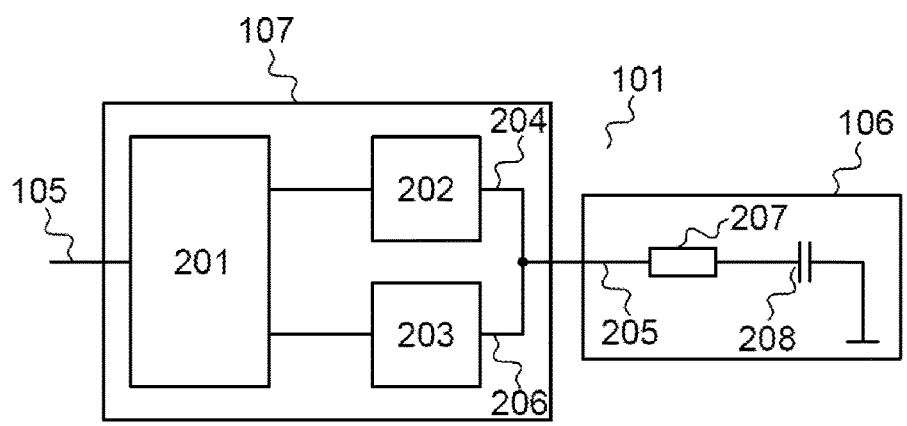
FIG. 2 is a line drawing evidencing a block diagram of a fill level switch with an evaluation of the resonance behavior of a probe.

FIG. 2 shows the control and evaluation electronic 107 as well as the probe 106 in an electric block diagram. The control and evaluation electronic 107 comprises a control and evaluation unit 201, which initiates and evaluates individual measuring processes and communicates the measurement to the outside as well as an alternating power generator 202 and an alternating voltage detector 203, both of which being connected to the control and evaluation unit 201.

In order to perform an individual measuring process the control and evaluation unit 201 controls the alternating power generator 202 such that it provides an alternating voltage signal at an output 204. The alternating voltage signal must be modified to determine a resonance point in its frequency. The output 204 is connected to an input 205 of the probe 106. An input 206 of the alternating voltage detector 203 is also connected to the input 205. The alternating voltage detector 203 detects the frequency-dependent alternating voltage amplitude of the alternating power applied to the inputs/outputs 204, 205, and 206 at the connection hub, and returns it to the control and evaluation unit 201. Within the control and evaluation unit 201 the connection between the alternating voltage frequency and the corresponding amplitude detected is processed and evaluated with regards to the resonance points. The resonance point is determined by the embodiment of the probe 106. In the exemplary embodiment shown, the probe is formed by a serial oscillating circuit, comprising an inductivity 207 and a schematically indicated capacity 208. The capacity 208 develops from an electrode, not shown in greater detail here, inside the probe 106, which forms a condenser with the environment. A frequency and/or amplitude shift of the resonance point indicates a capacity influence by the fill good and thus the fact that the limit 104 has been exceeded. As an alternative to an oscillation circuit, the resonance of a probe line can also be used to determine the limit 104.

Figure 3:
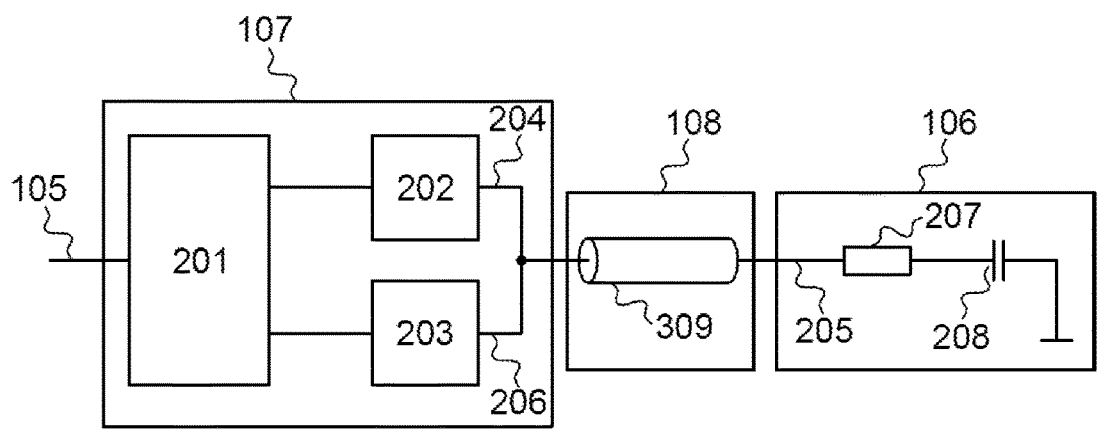
FIG. 3 is a line drawing evidencing a block diagram of a fill level switch according to FIG. 2 with a distanced probe according to prior art.

FIG. 3 is largely equivalent to the block diagram of FIG. 2 with the difference that the probe input 205 is farther distanced from the connecting hub between the inputs/outputs 204, 205 of the alternating power generator 202 and the alternating voltage detector 203. The connecting part 108 connects the parts and includes an electric conductor 309. The electric conductor 309 can be embodied for example as a coax cable, a two-wire cable, a single-wire cable, or a micro-strip. The length of the conductor depends, as already described, on the distance to be bridged between the probe 106 and the control and evaluation electronic 107. In a preferred embodiment, the length of connecting conductor 309 amounts to at least 50 cm, more preferably of at least 80 cm and even more preferably of at least 120 cm.

FIG. 3 shows an embodiment as common in prior art. This solution, in which only one electric line 309 is provided between the probe 106 and the connecting hub of the inputs/outputs 204, 206 shows the disadvantage that within the electric conductor 309 additional resonances develop, which depend on the length of the conductor. These additional resonances may interfere with a resonance originating in the probe 106 for the detection of the limit 104 such that any measurement is not possible or only with unreliable results.

Figure 4:
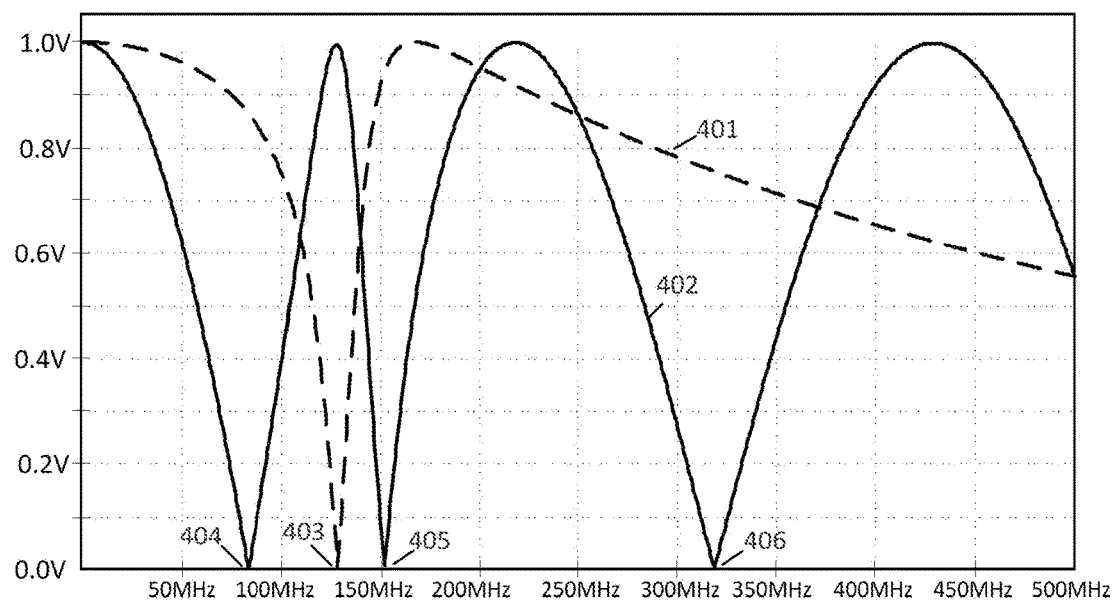
FIG. 4 is a line drawing evidencing exemplary resonance curves of the fill level switch of FIGS. 2 and 3.

FIG. 4 shows a frequency-voltage diagram with measuring curves that can develop in an embodiment according to FIGS. 2 and 3. The dot-dash curve 401 results in case of ideal conditions of an arrangement according to FIG. 2 without the electric conductor 309. The continuous curve 402 shows, however, the detected alternate voltage amplitude of an arrangement according to FIG. 3 with an exemplary length of 60 cm for the electric conductor 309. Here, several resonance points 404, 405, 406 develop from the previously one serial resonance 403 of the resonance measuring probe 106. This considerably aggravates the evaluation of the resonance and thus the determination if the limit 104 was exceeded.

Figure 5:
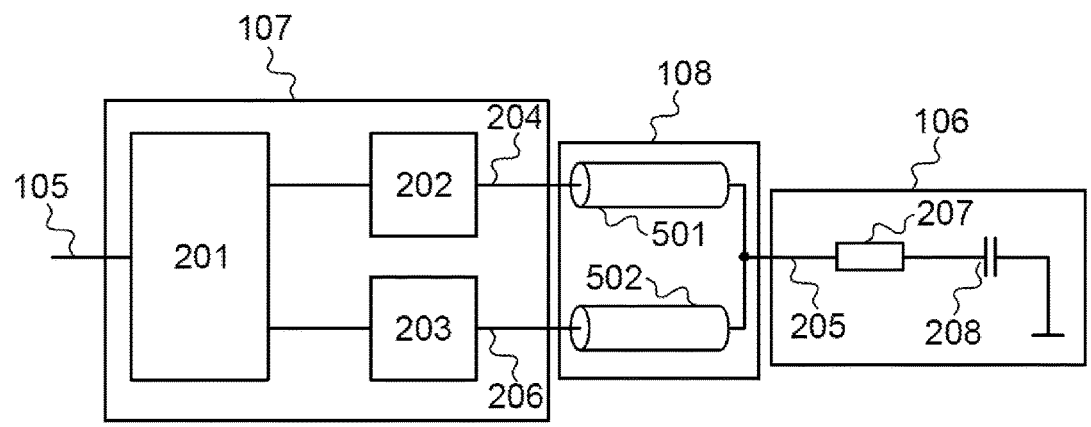
FIG. 5 is a line drawing evidencing a block diagram of a fill level switch according to FIG. 2 with a distanced probe.

FIG. 5 shows the block diagram of an embodiment according to the invention of a limit switch 101. The connection part 108 includes now, instead of one conductor, a first conductor 501 and a second conductor 502. The first conductor 501 connects the outlet 204 of the alternating power generator 202 to the input 205 of the probe 106, while the second conductor 502 connects the input 205 of the probe 106 to the input 206 of the alternating voltage detector 203. An alternating voltage, extending from the output 204 through the first conductor 501, is reflected more or less by the input 205 of the probe 106, depending on frequency. The impedance of the input 205 of the probe 106 changes considerably in the area of the resonance, rendering any adjustment of impedance between the first conductor 501 and the input 205 of the probe 106 impossible in principle.

The reflected alternating voltage returns on the one hand (via) the first conductor 501 and forms this way additional resonance points at the output 204 of the alternating power generator 202 by interfering still oscillating voltage. On the other hand, the alternating voltage reflected at the input 205 of the probe 106 travels via the second conductor 502 to the input 206 of the alternating voltage detector 203. Here, interferences with other voltages cannot occur, so that the voltage observed there reflects only the resonance behavior of the probe 106. However, here it is conditional that the alternating voltage supplied to the input 206 of the alternating voltage detector 203 is not reflected there. This is achieved in an impedance adjustment at the input 206 of the alternating voltage detector 203 to a conductor impedance of the second conductor 502. Such an impedance adjustment can occur for example by appropriate spurs or adjustment networks of components in an L, T, or Pi-structure.

An impedance adjustment is additionally necessary at the output 204 of the alternating power generator 202. For this purpose, an input impedance of the alternating power generator 202 must be adjusted at the output 204 to a line impedance of the first conductor 501. The impedance adjustment between the first and the second conductor 501, 502 to the alternating power generator 202 and/or the alternating voltage detector 203 to the end facing the control and evaluation electronic 107 ensures that the alternating voltages are not reflected repeatedly and this way additional resonances are prevented by interference of the reflected alternating voltage.

LIST OF REFERENCE NUMBERS

101 Level gauge
102 Surface of fill good
103 Container
104 Level, first
105 Conductor
106 Probe, measuring probe, measuring sensor
107 Evaluation element, control and evaluation electronic
108 Connecting part, connecting element
109 Process adaptation
110 Level, second
201 Control and evaluation unit
202 Alternating power generator, signal generator
203 Alternating voltage detector, signal detector
204 Generator output
205 Probe input
206 Detector input
207 Inductivity
208 Capacity
309 Connecting conductor or electric conductor
401 Curve, first
402 Curve, second
403 Resonance point, serial resonance of the measuring probe
404 Resonance point
405 Resonance point
406 Resonance point
501 first connecting conductor
502 second connecting conductor
601 Resonance curve
602 Resonance point, serial resonance of the measuring probe
$\lambda$ Wavelength The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A level gauge with a control and evaluation electronic comprising a signal generator to generate an alternating voltage, a signal detector to detect a frequency-dependent alternating voltage amplitude of the alternating power applied to the inputs/outputs, a resonant measuring probe and a connecting element electrically connecting the control and evaluation electronic to the measuring probe, wherein the connection element comprises a first connection conductor, which connects the signal generator to the measuring probe, and a second connecting conductor, which connects the measuring probe to the signal detector.

2. The level gauge according to claim 1, further comprising wherein a first impedance of the first connecting conductor and an input impedance of the output of the signal generator are adjusted and/or a second impedance of the second connecting conductor and an input impedance of the input of the signal detector are adjusted to each other.

3. The level gauge according to claim 2, wherein the first connecting conductor and the input impedance of the signal generator are adjusted to each other such that a reflection factor at the input of the signal generator is minimized, particularly equal to zero.

4. The level gauge according to claim 2, wherein the second connecting conductor and the input impedance of the signal detector are adjusted to each other such that a reflection factor at the input of the signal detector is minimized, particularly equal to zero.

5. The level gauge according to claim 3, wherein the adjustment occurs by selecting suitable, particularly standardized connecting conductors with a predetermined line impedance of particularly 50 Ohm or 75 Ohm, as well as by adjusting the input impedance of the signal generator and the signal detector by impedance adjustment networks, particularly in a L, T, or Pi-structure, or spurs or other conducting elements.

6. The level gauge according to claim 1, wherein one or both of the first connecting conductor and the second connecting conductor are embodied as a coax cable, two-wire cable, or strip line, particularly as a micro-strip.

7. The level gauge according to claim 1, wherein the level gauge is embodied as a fill level switch.

8. The level gauge according to claim 1, further comprising wherein a length of the connecting conductors amounts to at least at least 50 cm.

9. The level gauge according to claim 1, further comprising wherein a length of the connecting lines amounts to at least one fourth of a wavelength of the resonance frequency of the measuring probe.

10. The level gauge according to claim 1, further comprising wherein a resonance frequency of the measuring probe shows at least 10 MHz.

* * * * *